W. F. BAHR.
GATE.
APPLICATION FILED JUNE 20, 1916.
1,281,270.
Patented Oct. 15, 1918.
2 SHEETS—SHEET 2.
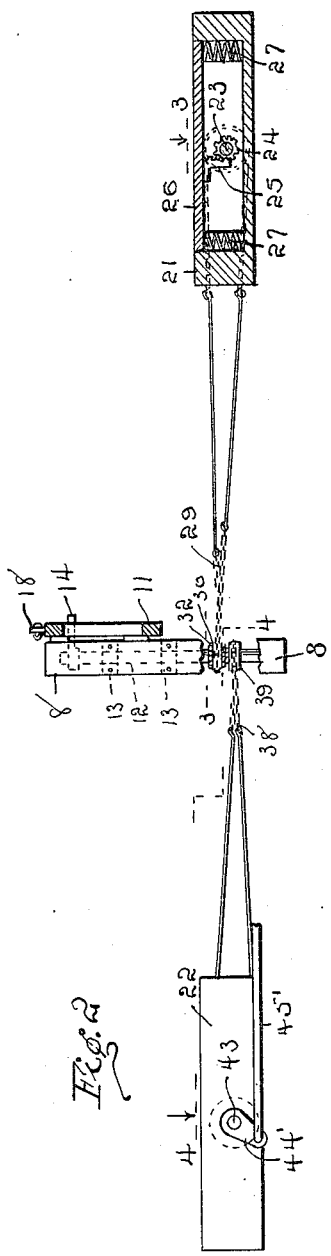
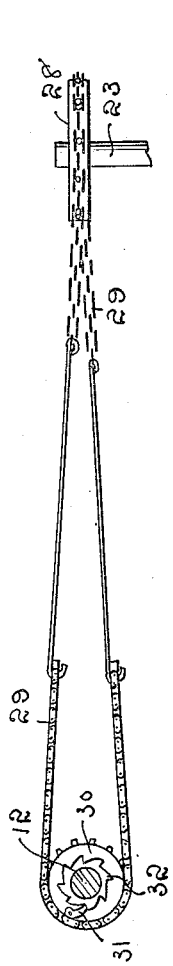
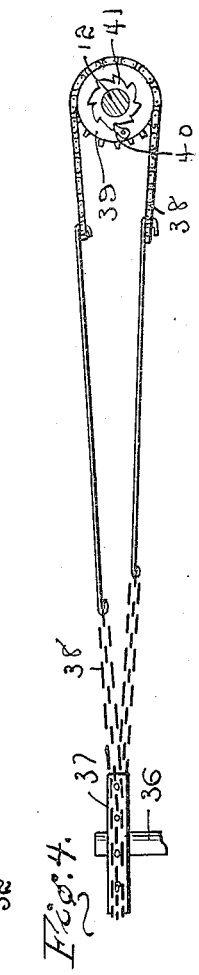
Inventor
W. F. Bahr.

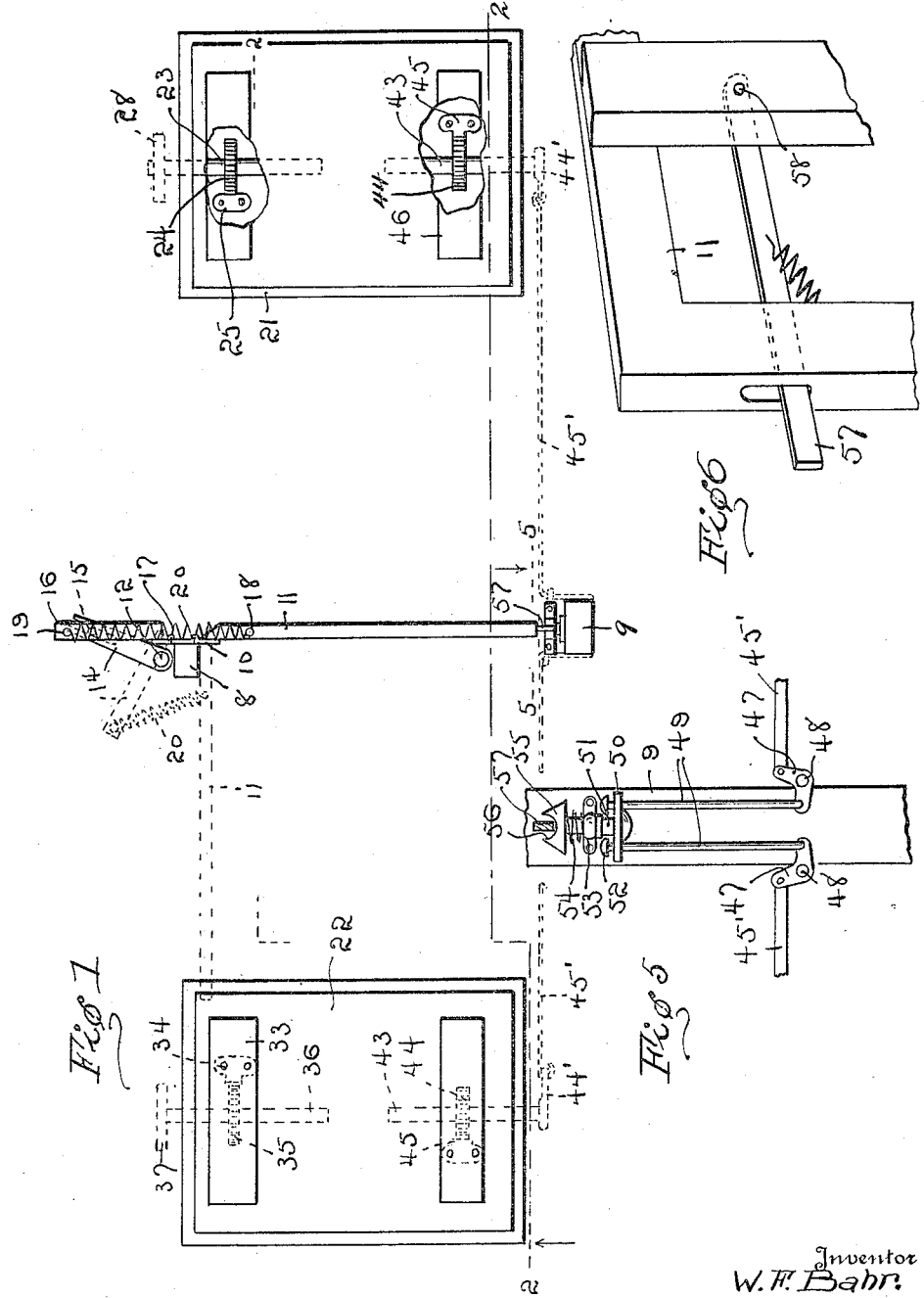

UNITED STATES PATENT OFFICE.

WILLIAM F. BAHR, OF GLEN ULLIN, NORTH DAKOTA.

GATE.

1,281,270.  Specification of Letters Patent.  Patented Oct. 15, 1918.

Application filed June 20, 1916. Serial No. 104,747.

*To all whom it may concern:*

Be it known that I, WILLIAM F. BAHR, a citizen of the United States, residing at Glen Ullin, in the county of Morton and State of North Dakota, have invented certain new and useful Improvements in Gates; and I do hereby declare the following to be a full, clear, and exact description of the invention, such as will enable others skilled in the art to which it appertains to make and use the same.

This invention relates to improvements in gates, and has for its primary object to provide means operable automatically by the weight of a carriage or wagon for automatically opening the gate.

Another object is the provision of means operable by the wagon to automatically close the gate subsequent to the passage of the wagon therethrough.

With these and other objects in view, the invention consists in the novel construction, combination and arrangement of parts as will be hereinafter specifically described, claimed and illustrated in the accompanying drawings, in which:

Figure 1 represents a plan view of the improved gate, partly broken away,

Fig. 2 represents a longitudinal sectional view on the line 2—2 of Fig. 1,

Fig. 3 represents a horizontal sectional view on the line 3—3 of Fig. 2,

Fig. 4 represents a horizontal sectional view on the line 4—4 of Fig. 2,

Fig. 5 represents a sectional view on the line 5—5 of Fig. 1 and

Fig. 6 represents a fragmentary perspective view of one end of the gate.

Referring to the drawings in detail, wherein similar reference numerals designate corresponding parts throughout the several views, the numerals 8 and 9 indicate the gate posts, which are arranged upon opposite sides of the roadway, and the gate post 9 carries hinges 10 whereby the gate 11 is hingedly secured thereto. A vertically disposed shaft 12 is rotatably secured by bearings 13 to the post 8 and carries at its upper terminal an arm 14, having the free end bifurcated to receive a depending pin 15 carried by the bar 16, which latter is pivotally secured by hinges 17 to the gate post 8 above the arm 14. Vertically disposed pins 18 and 19 are rigidly secured to the upper member of the gate 11 and the bar 16, respectively, and are connected by a contractile spring 20, which is adapted, when the bar 16 is moved out of line with the gate 11 to automatically open the latter.

Platforms 21 and 22 are arranged on opposite sides of the gate 11, and the platform 21 supports, in the end adjacent the gate post 8, a shaft 23, on which is mounted a pinion 24, meshing with a vertically disposed rack bar 25. The rack bar 25 is rigidly secured to the bottom of a vertically movable plate 26 supported in the platform 21 and is adapted to be depressed by the weight of a carriage or wagon. The movable plate 26 is normally retained in elevated position by the tension of springs 27 engaged under each end thereof. As clearly shown in Fig. 2, the platform 21 is of hollow construction, so as to provide a housing for the shaft 23 and coöperating parts. One end of the shaft 23 projects through the wall of the platform 21 and supports a sprocket wheel 28, over which is trained a chain 29. The opposite end portion of the chain 29 is extended over a sprocket wheel 30, loosely mounted upon the shaft 12, and adapted to be locked for rotation therewith by a pivoted pawl 31 movable into engagement with the teeth of a ratchet wheel 32, which latter is rigidly secured to the shaft 12.

A spring actuated and vertically movable plate 33 is mounted in the platform 22 on the opposite side of the gate 11, and is connected by a rack bar 34 with a pinion 35 secured to the shaft 36. A sprocket wheel 37 is rigidly secured to the shaft 36 and is connected by a chain 38 with a sprocket wheel 39 loosely mounted upon the shaft 12 below the sprocket wheel 30. The sprocket wheel 39 is adapted to be locked for rotation with the shaft 12 by a pivoted pawl 40 movable over the teeth of a ratchet wheel 41, which latter is rigidly secured to the shaft 12 and the teeth of which are disposed oppositely to those of the ratchet wheel 32.

Shafts 43 are rotatably supported in the platforms 21 and 22 in the ends opposite the shafts 23 and 36 and support pinions 44 which are engaged with vertically disposed rack bars 45, rigidly secured to the under sides of spring actuated and vertically movable plates 46. The outer terminals of the shafts 43 are connected with relatively short crank arms 44', which are secured to connecting rods 45'.

The connecting rods 45' are extended inwardly toward the gate post 9 and are pivotally connected with the vertical arms of a pair of bell cranks 47, which latter are pivotally secured at 48 on opposite sides of the gate post 9, and are connected at their opposite terminals with a pair of vertically disposed rods 49. The upper terminals of the rods 49 are extended through a horizontally disposed plate or head 50 carried by a shank 51 and are provided with heads 52, adapted to engage the bar 50, during the downward movement of the rods 49. The shank 51 is movable vertically in a guide or support 53 attached to the post 9 and is normally retained in elevated position by the tension of a coil spring 54. A latch keeper 55 is rigidly secured in the upper terminal of the shank 51 and is provided with a recess 56 adapted to receive the pivoted latch 57 pivotally secured at 58 to the gate 11. The opposite side edges of the keeper 55 are beveled so as to automatically deflect the pivoted end of the latch 57 upwardly as the gate is moved to closed position.

In operation, a carriage or wagon approaching the gate 11 from right to left, in Fig. 1, travels over and depresses the vertically movable plates 26 and 46. The downward movement of the plate 46 under the weight of the vehicle lowers the rack bar 25, thereby rotating the pinion 24 and shaft 23 imparting movement to the chain 29, which latter transmits a rotary movement to the sprocket wheel 30. The movement of the sprocket wheel 30 is transmitted to the shaft 12 through the pawl 31 and ratchet wheel 32, thereby rotating the shaft 12 and swinging the bar 16 to the left to the approximate position illustrated in dotted lines in Fig. 1, thereby moving said bar out of line with the gate 11 and causing the spring 17 to exert an outward pull upon the gate. The downward movement of the plate 46 lowers the rack bar 45 and rotates the pinion 44, shaft 43 and crank arm 44', moving the connecting rod 45' inwardly and rocking the bell crank 47. The rocking movement of the bell crank 47 is transmitted to the vertically disposed rod 49 associated therewith, lowering the rod together with the shank 51 and the latch keeper 55, against the tension of the spring 54, thereby releasing the latch 57 and permitting the gate to swing open to the dotted line position illustrated in Fig. 1. When the vehicle moves off of the plates 26 and 46, the rack bar and plates are automatically returned to initial position by the springs associated therewith, and during the return movement of said plates the pawl 31 moves idly over the ratchet wheel 32. Subsequent to the passage of the vehicle through the gateway, the wheels thereof move over and depress the vertically movable plate 33 in the platform 22, thereby depressing the rack bar 34 and imparting a rotary movement to the shaft 36 through the pinion 35. The rotary movement of the sprocket wheel 37 is transmitted to the shaft 12 through the sprocket wheel 37, chain 38, sprocket wheel 39, pawl 40 and ratchet wheel 41, thereby throwing the arm 14 and bar 16 connected therewith to the right, in Fig. 1, and disposing the spring 20 in such position as to exert a pull upon the gate 11, thereby closing the latter. As the gate 11 moves to closed position the spring actuated latch 57 automatically engages in the recess 56 of the keeper 55 and is locked in closed position. During the return movement of the plate 33 the ratchet wheel 40 moves idly over the keeper of the ratchet wheel 41.

What is claimed is:

1. A gate comprising a pair of spaced posts, a gate hinged to the posts, platforms arranged on opposite sides of the gate, a plurality of shafts arranged in pairs and each pair journaled in one platform and extending through the opposite side walls thereof, vertically movable plates secured in said platforms, racks secured to the plates, pinions secured to each pair of shafts and meshing with each respective rack of the plates, and means connected to one shaft of each pair for releasing the gate to permit it to be opened upon movement of the platforms.

2. A gate comprising a pair of spaced posts, a gate hinged to the posts, platforms arranged on opposite sides of the gate, plates vertically movable in the platforms, shafts located in the platforms and extending through the opposite side walls thereof, rack bars secured to the plates, pinions carried by each shaft and meshing with the rack bars, gate opening means secured to one post and at the hinged end of the gate, means for normally retaining the gate closed on the opposite post, and means carried by certain of the shafts and coöperating with the gate closing means to release the gate upon the depressing of the platforms.

In testimony whereof I affix my signature in presence of two witnesses.

WILLIAM F. BAHR.

Witnesses:
  LAWRENCE T. NELSON,
  PAUL M. BARNES.

Copies of this patent may be obtained for five cents each, by addressing the "Commissioner of Patents, Washington, D. C."